Patented July 17, 1923.

1,462,052

UNITED STATES PATENT OFFICE.

WERNER SIEBERT, OF LAUFENBURG, SWITZERLAND, ASSIGNOR TO NITRUM AKTIEN-GESELLSCHAFT, OF ZURICH, SWITZERLAND, A CORPORATION OF SWITZERLAND.

PROCESS FOR OBTAINING NITRIC ACID BY MEANS OF THE ELECTRIC ARC IN A CLOSED CYCLE.

No Drawing.   Application filed May 13, 1922.   Serial No. 560,728.

*To all whom it may concern:*

Be it known that I, Dr. WERNER SIEBERT, a citizen of the Republic of Germany, residing at Laufenburg, Aargau, Switzerland, have invented certain new and useful Improvements in a Process for Obtaining Nitric Acid by Means of the Electric Arc in a Closed Cycle, of which the following is a specification.

It is well known that with the electric arc process for obtaining nitric acid from the atmosphere an increase in the yield of oxidized nitrogen of about 25% is obtained, if instead of using atmospheric air only a gas mixture composed of one half of nitrogen and one half of oxygen is passed through the electric furnace.

Of the gas led through the electric furnace, only about 2 to 3% of NO is obtained, so that about 97 to 98% of the oxygen-nitrogen gas mixture leaves the absorption plant.

If this gas mixture were allowed to escape into the open air, the process would be highly uneconomical. Therefore the gases are led back in a closed cycle to the electric furnace and a quantity of the orginial gas mixture is added, that corresponds to the quantity of nitrogen and oxygen which has been previously absorbed in the process.

The gas leaving the absorption plant is saturated with moisture, which in practical operation has caused great difficulties as the nitrous fumes which escape from the electric furnace form in connection with this moisture dilute nitric acid in the apparatus installed between the furnace and the absorption plant, corroding and destroying such apparatus.

These difficulties could be overcome by inserting a drying plant in the circuit between the absorption plant and the electric furnace.

However such an installation would not only be very costly but the operating costs would also be very high, offsetting all the advantages obtained by the nitrogen-oxygen closed circuit system.

According to the present invention, these difficulties can easily be overcome by absorbing the nitrous gases at a low temperture in the last tower or towers or portion of the absorption plant and by the use of nitric acid of a corresponding concentration so that the content of vapor is reduced to a negligible amount the vapor tension of the escaping gas being kept so low that corrosion or destruction of apparatus does not occur.

To arrive at this result it is necessary, in contradistinction to the ordinary practice observed up to the present, to supply the above-mentioned portion of the absorption plant with nitric acid of a concentration of not less than 15% and not more than 33% $HNO_3$ and at the same time to cool this portion of the absorption plant artificially down to about minus 10° to 20° C.

Thereby the surprising result is attained that the absorbing capacity of such nitric acid at the low temperature above mentioned is far greater than that of water or of the very diluted nitric acid hitherto used for absorption purposes.

Further it has been found that with this mode of absorption practically all nitrous fumes are converted into nitric acid and the installation of an alkali absorption plant to neutralize the non-absorbed fumes is absolutely unnecessary.

The low temperature in the absorption plant is obtained either by cooling the gases down sufficiently before they enter the absorption plant or by cooling the circulating nitric acid in special apparatus.

The remaining fumes, which escape from the absorption plant and still have an exceedingly low temperature, may be utilized to cool the gases before they enter the absorption plant.

I claim:

1. In a process for obtaining nitric acid by means of the electric arc in a closed cycle, the maintaining of a relatively low temperature within the absorption apparatus so that the content of vapor in the oxygen and nitrogen gas mixture led back to the electric furnace is reduced to a negligible amount.

2. In the process for obtaining nitric acid by means of the electric arc in a closed cycle maintaining within the absorption apparatus a temperature of below —10° C.

3. In the process of obtaining nitric acid by means of the electric arc in a closed cycle, the maintaining of a relatively low temperature within the absorption apparatus so that the content of vapor in the oxygen and nitrogen gas mixture led back to the electric furnace is reduced to a negligible amount and the use of nitric acid of such concentration that it can be cooled to a low temperature.

4. In the process for obtaining nitric acid by means of the electric arc in a closed cycle, the maintaining of a temperature as low as —10° C. within the absorption apparatus so that the content of vapor in the oxygen and nitrogen gas mixture led back to the electric furnace is reduced to a negligible amount and the use of nitric acid of a concentration of as much as 15%.

5. In the process for obtaining nitric acid by means of the electric arc in a closed cycle, maintaining a relatively low temperature within the absorption apparatus so that the content of vapor in the oxygen and nitrogen gas mixture led back to the electric furnace is reduced to a negligible amount, and using the cold gases which leave the absorption apparatus to cool the warm gases before they enter the absorption apparatus.

In testimony whereof I affix my signature.

Dr. WERNER SIEBERT.